United States Patent
Rowley et al.

(10) Patent No.: US 9,413,745 B1
(45) Date of Patent: Aug. 9, 2016

(54) SYSTEM AND METHOD FOR ACCESSING A MEMBERSHIP-BASED SERVICE

(71) Applicant: William W. Rowley, Chagrin Falls, OH (US)

(72) Inventors: William W. Rowley, Chagrin Falls, OH (US); Hersh Patel, Pepper Pike, OH (US); Micheal Speck, Lakewood, OH (US)

(73) Assignee: William W. Rowley, Chagrin Falls, OH (US)

( * ) Notice: Subject to any disclaimer, the term of this patent is extended or adjusted under 35 U.S.C. 154(b) by 0 days.

(21) Appl. No.: 14/606,463

(22) Filed: Jan. 27, 2015

Related U.S. Application Data

(60) Provisional application No. 61/950,923, filed on Mar. 11, 2014.

(51) Int. Cl.
| | |
|---|---|
| *G06F 21/33* | (2013.01) |
| *H04L 29/06* | (2006.01) |
| *H04L 12/927* | (2013.01) |
| *H04L 29/08* | (2006.01) |
| *G06Q 10/10* | (2012.01) |

(52) U.S. Cl.
CPC .............. *H04L 63/08* (2013.01); *G06F 21/33* (2013.01); *G06Q 10/10* (2013.01); *H04L 47/808* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 7,835,923 B1 | 11/2010 | Rowley | |
| 8,145,275 B2 | 3/2012 | Cunningham et al. | |
| 8,285,559 B1 | 10/2012 | Rowley | |
| 8,374,334 B2 | 2/2013 | Sankaranarayanan | |
| 8,473,749 B1* | 6/2013 | Madsen et al. | 713/187 |
| 2002/0057678 A1* | 5/2002 | Jiang | H04L 12/5895 370/353 |
| 2007/0033078 A1* | 2/2007 | Mandalia et al. | 705/7 |
| 2008/0015881 A1* | 1/2008 | Shankar | 705/1 |
| 2008/0177638 A1* | 7/2008 | Butler | 705/26 |
| 2008/0208741 A1* | 8/2008 | Arthur et al. | 705/41 |
| 2010/0146500 A1* | 6/2010 | Joubert | G06F 8/61 717/178 |
| 2010/0218241 A1* | 8/2010 | Faryna | 726/5 |
| 2011/0019812 A1* | 1/2011 | Sankaranarayanan | 379/266.01 |
| 2011/0270668 A1* | 11/2011 | Fagan et al. | 705/14.36 |
| 2012/0265695 A1 | 10/2012 | Tuchman et al. | |
| 2013/0024914 A1* | 1/2013 | Ahmed et al. | 726/4 |
| 2013/0103486 A1* | 4/2013 | Hess et al. | 705/14.38 |
| 2013/0223614 A1 | 8/2013 | Tuchman et al. | |
| 2014/0022328 A1* | 1/2014 | Gechter | G06Q 30/06 348/14.02 |

OTHER PUBLICATIONS http_www.amazon, Amazon Kindle—see "Revolutionary on-device tech support" via the "Mayday button", downloaded Jan. 27, 2015.

* cited by examiner

*Primary Examiner* — David Pearson
(74) *Attorney, Agent, or Firm* — Hahn Loeser & Parks, LLP

(57) ABSTRACT

System and methods for a membership-based service or network to enable access to membership-related services are provided. A portal application for members, which is accessible via a mobile device of a member, transforms the mobile device of the member into a membership card, an instrument to provide information employable to access membership services, and an apparatus to access the membership-related services. A membership management server supports the portal application and facilitates provision of services to members by a membership provider.

13 Claims, 11 Drawing Sheets

SYSTEM AND METHOD FOR ACCESSING A MEMBERSHIP-BASED SERVICE

CROSS-REFERENCE TO RELATED APPLICATIONS

This application claims priority to U.S. Provisional Application Ser. No. 61/950,923, filed Mar. 11, 2014, the entirety of which is incorporated herein by reference.

BACKGROUND OF THE INVENTION

1. Field of the Invention

This application relates generally to a providing membership-based services and, more specifically, to systems and methods for identifying members and enabling access to membership services.

2. Description of Related Art

Membership programs typically extend products, services, or rewards to members in exchange for some action by the members. For example, some membership programs, such as loyalty programs typically offered by merchants, entice members with rewards, discounts, or other incentives in exchange for continued patronage. Other programs, for example club memberships (e.g., fitness clubs, retail clubs, etc.), provide access to facilities in exchange for payment of a membership by the members. Though not traditionally considered a membership program, health insurance providers provide a service in which special pricing or discounts from healthcare providers becomes available to members in exchange for payment of an insurance premium.

Often, membership programs include a card that identifies a card holder as a member. For example, the card is utilized a proof of membership to enter a facility. In other examples, the card can include printed instructions to follow to redeem or utilize services of the membership program. For instance, the card could include a phone number to call, a URL to request, an email address to contact, etc., which the member utilizes to access benefits associated with membership.

BRIEF SUMMARY OF THE INVENTION

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of the summary is to present some concepts related to some exemplary non-limiting embodiments in a simplified form as a prelude to the more detailed description of the various embodiments that follow.

In various, non-limiting embodiments, a membership-based service or network provides access to information, concierge services, healthcare support, travel support, and/or other services or information to members as described herein. The membership-based service includes a membership management server that having one or more data stores retaining membership information related to members, interaction information pertaining to member contacts, and any other information suitable for facilitating access to or provision of services available to members. The membership management server further includes an interface to communicate with members to facilitate access to services associated with membership and an interface enabling a membership provider to interact with members, to record interaction details, to generate new memberships, and the like.

The membership-based service further includes a portal application for members accessible via a mobile device of a member. The portal application transforms the mobile device of the member into a membership card, an instrument to provide information employable to access membership services, and an apparatus to access the membership services. Thus, the mobile device of the member, via the portal application, becomes a mechanism to identify the member and also becomes a medium of interaction between the member and available membership services.

These and other embodiments are described in more detail below.

BRIEF DESCRIPTION OF THE DRAWING

Various non-limiting embodiments are further described with reference the accompanying drawings in which.

DETAILED DESCRIPTION OF THE INVENTION

Figure 1:
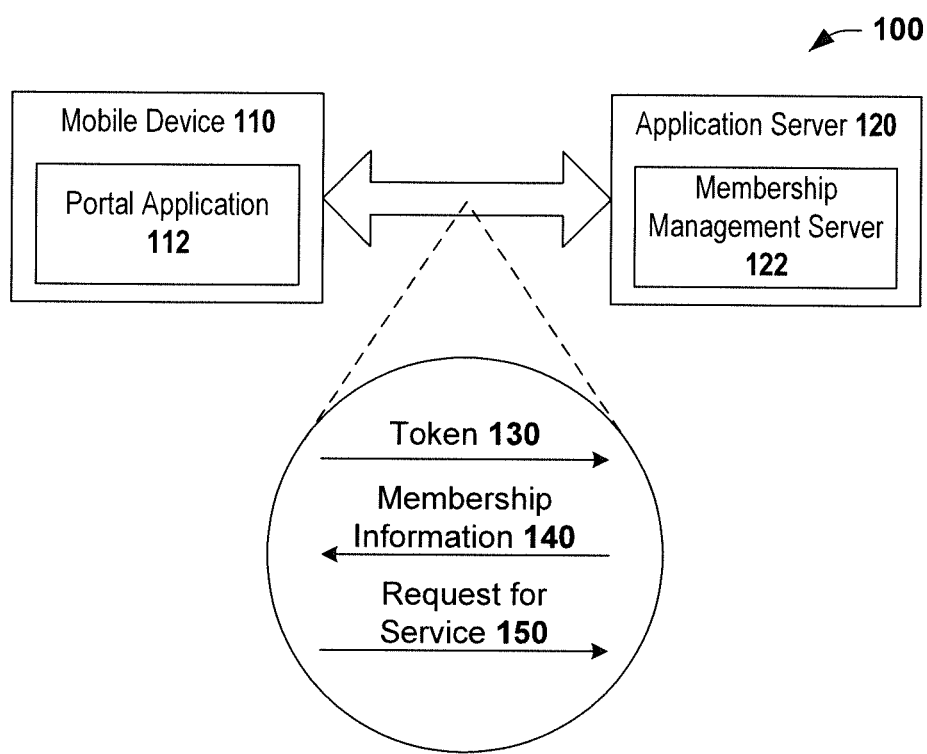
FIG. 1 is a schematic block diagram of an exemplary, non-limiting embodiment for a membership-based service according to one or more aspects.

As discussed in the background, programs, services, organizations, or networks, which involve some concept of membership, typically utilize a card that serves as a proof of membership for the cardholder. The card can further include printed information (e.g., a number, a name, etc.) or a printed code (e.g., a bar code, QR code, etc.) to identify the cardholder. In some instances, the card may also include printed instructions to access membership services. When accessing membership services, some action or input by the member is generally demanded by a membership provider to identify, authenticate, or otherwise verify the member is indeed entitled to access the services.

In various, non-limiting embodiments, a system and associated methods are provided for a membership-based service that integrates a means for identifying a member and a means for the member to access membership services into a mobile device of the member. As utilized herein, a "membership-based service" includes any product or service to which membership is a prerequisite. That is, the product or service is extended by an organization or network to entities holding memberships to or with the organization or network. To this end, the organization or network providing the membership-based service can be referred to as a "membership provider" and, as utilized herein, "membership service" refers to the product or service offered by or fulfilled by the membership provider.

According to one example, the membership provider can be an organization (e.g., a non-profit or for-profit entity) providing informational and/or concierge services to qualified members. The membership provider, according to this example, can receive a membership fee in exchange for the services or can solicit a donation from members to the membership provider. At least a portion of the donation or membership fee can be directed, by the membership provider, to philanthropic goals such as, but not limited to, research funding, facility improvements, or other charitable endeavors. For instance, the membership provider can help fund medical research, hospital improvements, or other advances in healthcare. In return for the financial support, the membership provider builds an extensive network of healthcare facilities, providers, and researchers that can be leveraged by the membership provider to extend enhanced medical or healthcare support to members as part of the membership services.

The foregoing example illustrates just one type of membership-based service which can utilize the aspects described herein. It is to be appreciated that other services can employ the techniques herein. For instance, health insurance providers, merchant (i.e., loyalty programs), clubs, or the like can employ the disclosed systems and methods with members.

According to an aspect, a mobile device of a member includes a portal application configured to operate as a proof of membership, to identify the member, and to function a medium of interaction to access membership services. The portal application is supported by a membership management application on an application service associated with the membership provider.

Upon start-up, the portal application can automatically, without user action or input, identify the member to the membership management application. That is, for the portal application to operate and provide access to membership services, the member does not have to enter a username/password pair, a member number, and/or any other authentication or identification information. To accomplish identification, the portal application can communicate an authenticated identity to the membership management application. Here, "authenticated identity" refers to any data known, by an authenticating agent, to be uniquely associated with a particular member. Accordingly, upon receipt of the data (i.e., the authenticated identity), a recipient confirms communication with the member corresponding to the data. According to one or more examples, the authenticated identity can be a token, such as a universally/globally unique identifier (UUID/GUID) or the like.

Following identification, the membership management application recognizes the mobile device having the portal application as belonging to the member. Accordingly, the membership management application can retrieve stored membership information and transmit at least a portion of that information to the portal application. As utilized herein, "membership information" can include profile or personal information of the member, membership services available to the member, historical data associated with the member and the members interactions with the membership-based service or the membership provider, membership status information, or substantially any other information specific to the member within the context of (or relevant to) the membership provider or membership-based service.

In addition to the membership information, the membership management application can transmit interface information to the portal application. According to an example, the portal application can be a web-based application executing within a web browser application on the mobile device. As such, the interface information can include markup information, style sheets, scripts, multimedia (images, video, audio, etc.), or other assets which are rendered by the web browser application to generate a graphical user interface of the portal application. The interface information can be combined with the membership information to generate a graphical user interface that is personalized to the member. It is to be appreciated that the web browser application can be a standalone browser instance, a conventional browser application, an embedded browser object, or the like. Further, it is to be appreciated that the portal application can be a native application executing within an operating environment of the mobile device as opposed to within a web-browser environment. Other forms for the portal application are contemplated as well. For example, the portal application can be a native application with an embedded browser to implement at least a portion of the functionality described herein.

With the graphical user interface of the portal application, the member can provide user input. The user input can operate to change a state of the portal application (e.g., change the graphical user interface to access a particular function), or to supply data forming a basis of a request for service transmitted by the portal application to the membership management application. As utilized herein, the "request for service" can be a data package specifying or including an invitation for a response from the membership provider in accordance with the membership services provided, a request to access to functionality associated with membership services, a result of execution of the functionality, a notification of an action taken by the member related to the membership services, or the like.

According to a further aspect, the membership management application, in response to the request for service from the member, can communicate a notification to a computing device associated with a consultant of the membership provider. The consultant can be responsible for carrying out the service requested. For instance, in the case of a request for informational services, the consultant can research a query included in the request and communicate requested information to the member. In the case of a request for concierge services, the consultant can make the arrangements requested (e.g., schedule an appointment, arrange transportation, book accommodations, reserve a travel itinerary, etc.) and inform the member of the arrangement once made.

In one embodiment, a mobile device is described herein. The mobile device can include a processor, a non-transitory, computer-readable medium coupled to the processor, and a first communication interface configured to enable communication with an application server. The non-transitory, computer-readable medium stores computer-executable instructions for a portal application. The portal application, when executed by the processor, configures the processor of the mobile device to communicate, autonomously and upon initial execution of the portal application by the processor, an authenticated identity of a member of a membership-based service to the application server via the first communication interface. The portal application further configures to the processor to receive, from the application server via the first communication interface, membership information associated with the member, the membership information being retrieved by the application server based at least in part on the authenticated identity. In addition, the portal application configures the processor to communicate, to the application server via the first communication interface, a request for service, wherein services available for request are specified, at least in part, by the membership information.

According to an example, the mobile device can include a second communication interview configured to enable communication via a different modality than the first communication interface. The portal application can configure the processor to initiate a communication using the different modality via the second communication interface, the communication being initiated with a communication system associated with the application server. Further to this example, the request for service communicated to the application server via the first communication interface indicates the communication using the different modality via the second communication interface is initiated. The second communication interface, for instance, is a phone interface and the different modality is a voice communication and the first communication interface is a network interface for a data communication.

In one or more other examples, the authenticated identity is communicated with the request for service to the application server via the first communication interface. The request for service includes at least one of a request for information, a request for action, a renewal request, an invitation request, or a donation request. The portal application further configures the processor to receive user input, via an input device of the mobile device, and to generate the request for services based at least in part on the user input. The non-transitory, computer-readable medium stores the authenticated identity as token information. In addition, the portal application further configures the processor to: receive interface information related to at least a structure of a graphical user interface displayable on a display of the mobile device; generate the graphical user interface based at least on the interface information and the membership information; and display the graphical user interface on the display of the mobile device.

According to another embodiment, a system is described. The system include an application server having a processor, a non-transitory, computer-readable storage medium coupled to the processor, and a communication interface configured to communicate with at least a computing device associated with a membership provider and a mobile device of a member. The non-transitory, computer-readable medium stores computer-executable instructions for a membership management application. The membership management application, when executed, configures the processor to: receive, from the mobile device of the member, an authenticated identity associated with the member; communicate membership information to the mobile device, the membership information being retrievable from a data store on the non-transitory, computer-readable medium and stored in relation with the authenticated identity; receive, from the mobile device of the member, a request for service corresponding to services offered by the membership provider; and communicate, to the computing device associated with the membership provider, a notification that includes the request for service and identification information associated with the request for service.

The system can also include a communication system configured to enable communication with the mobile device of the member via a different modality than utilized by the communication interface of the application server and a communication device associated with the membership provider that enables communication with the mobile device of the member via the different modality over the communication system. In an example, the request for service indicates a communication over the communication system is initiated. According to another example, the request for service, when received, incorporates the authenticated identity of the member corresponding to the mobile device communicating the request for service. When the request for service incorporates the authenticated identity, the membership management further configures the processor to: extract the authenticated identity from the request for service; generate identification information based on data retrieved from the non-transitory, computer-readable medium, the data retrieved being stored in associated with the authenticated identity; and generate the notification to include the identification information.

The membership management application further configures the processor to communicate, to the mobile device of the member, an invitation to join a membership service offered by the membership provider. The invitation includes a temporary token to identify the member. The membership management application further configures the processor to transmit, upon receipt of a transmission from the mobile device that includes the temporary token, a second token to the mobile device for storage thereon. The second token forms a basis for the authenticated identity. In a further example, the membership management application configures the processor to revoke the authenticated identity associated with the mobile device of the member.

The membership management application further configures the processor to receive, from the computing device associated with the membership provider, interaction information specifying a history of interaction between the membership provider and the member; and store the interaction information on the non-transitory, computer-readable medium of the application server. In one example, where the request for service is a request to share access to membership services, the membership management application further configures the processor to: extract, from the request to share access, an identity of a person to which access is to be shared; and communicate, to a second mobile device associated with the person to which access is to be shared, an invitation to install a portal application to the second mobile device.

In another example, the computing device is associated with a consultant of the membership provider designated to the member. The membership management application further configures the processor to identify the consultant based on the authenticated identity received from the mobile device and to direct the notification to the computing device of the consultant in response to the request for service.

An overview of some embodiments for a membership-based service has been presented above. As a roadmap for what follows next, the membership-based service is described in more detail. Afterwards, an exemplary computing device and computing environment, in which such embodiments and/or features described herein can be implemented, are described.

With reference to the drawings, the above noted features and embodiments are described in greater detail. Like reference numerals are used to refer to like elements throughout.

Turning to FIG. 1, illustrated is a schematic block diagram of an exemplary, non-limiting embodiment of a system 100 for a membership-based service. System 100 can include a mobile device 110 having a portal application 112 thereon. The mobile device 110 is associated with a member of the membership-based service. The mobile device 110 communicates with application server 120. The application server 120, which is associated with a membership provider of the membership-based service, can include a membership management application or server 122 configured to support the portal application 112. For instance, the membership management server 122 can install the portal application 112 to the mobile device 110, verify an identity of the member, push membership information to portal application 112, and receive service requests from members via the portal application 112. According to further aspects, the membership management server 122 enables access to consultants of the membership provider to membership information, member data, and/or other data or functionality associated with membership services extended by the membership provider.

The mobile device 110 and application server 120 can communicate via the Internet, a local area network (LAN), a wide area network (WAN), or a combination thereof over one or more wired or wireless links. For example, the mobile device 110 can connect wirelessly, via WiFi, cellular radio, or the like, to a first LAN or WAN. The first LAN or WAN, in turn, is connected via a cellular communication link or a wired link to the Internet. Also, connected to the Internet is a second LAN or WAN to which the application server 120 are connected wired or wirelessly. It is to be appreciated that the above connection scheme is an example of one possible setup and that other network topologies are employable with the aspects described herein and the claimed subject matter. For instance, system 100 can be implemented as a cloud-based or Internet-based system. Accordingly, the a membership-based service provided by system 100 can be a cloud service and, as such, a nebulous networking and/or computing structure, generally opaque to mobile device 110, implements application server 120 and enables access to the application servers 120 by mobile device 110 via one or more exposure points (e.g., IP addresses, web addresses, network addresses, domain names, uniform resource indicators (URIs), application program interfaces (APIs), etc.). In this manner, the application server 120 can execute on one or more physical computing devices (i.e., hardware) located remotely from mobile device 110 such as in a data center or other installation. In addition, the application server 120 can also execute on one or more virtual machines, which in turn, execute on one or more physical computing devices. In this way, the diagnostic software service provided by the application server 120 can be modified (e.g., relocated to different physical hardware, scaled up (i.e., given greater resources), scaled down (i.e., given less resources), etc.) without disruption to mobile device 110.

As shown in FIG. 1, the portal application 112 can transmit a token 130 to the membership management server 122. The token 130, in an example, can be a UUID/GUID, a cryptographically-generated key, a certificate, a digital signature, or some other data suitable to uniquely identify the member associated with the mobile device 110 within the context of system 100. Thus, the token 130 operates as an authenticated identity of the member, which can be communicate by the portal application 112 to indicate and verify the identity of the member associated therewith.

Upon receipt of the token 130, the membership management server 122 can recognize the member communicating via the mobile device 110. The membership management server 122 utilizes the token 130 to retrieve membership information 140 from a data store (e.g., database or the like) retained on a non-transitory, computer-readable storage medium of the application server 120. The membership information 140, or a portion thereof, can be transmitted by the membership management server 122 to the portal application 112. The membership information 140 can be transmitted in connection with interface information (not shown) for generating a graphical user interface of the portal application 112. Via the graphical user interface, the portal application 112 can receive user input from the member and utilize the user input received to generate a request for service 150, which is communicated to the membership management service 122. According to an aspect, the token 130 is communicated along with the request for service 150 so as to associated the request with the member.

It is to be appreciated that other requests, not associated with membership services, can be communicated from the mobile device 110 (or the portal application 112) to the application server 120. Such requests can include resource requests for the interface information described above. Further, each of these requests can also be accompanied by the token 130 to provide the authenticated identity of the member. In some cases, the resources requests can incorporate or integrate information particular to the member. In these cases, the membership management server 122, on the basis of the authenticated identity embodied by token 130, retrieves this information and transmits the information (as membership information 140 for example) along with the resources requested. It to be appreciated that the integration of membership information 140 along with other resources can be performed by the portal application 112, i.e., upon receipt, or by the membership management server 122 prior to transmission.

Figure 2:
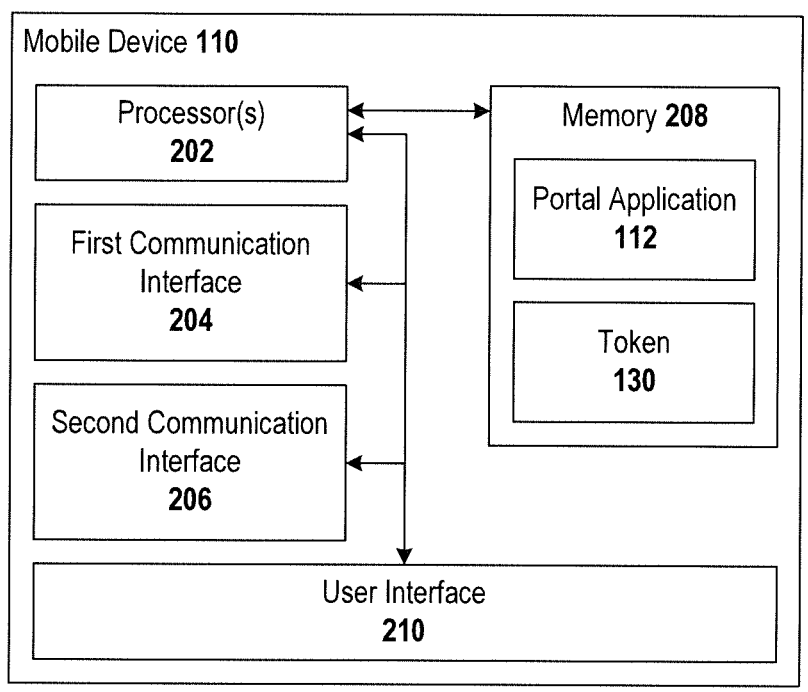
FIG. 2 is a schematic block diagram of an exemplary, non-limiting mobile device according to one or more aspects.

FIG. 2 illustrates a block diagram of an exemplary, non-limiting embodiment of mobile device 110. Mobile device 110 includes one or more processor(s) 202 configured to execute computer-executable instructions such as instructions composing portal application 112. Such computer-executable instructions can be stored on one or more computer-readable media including a non-transitory, computer-readable storage medium such as memory 208 of mobile device 110. The memory 208 can also store token 130, described above, and the portal application 112 can access the token 130 stored on memory 208 to communicate the authenticated identity to the application server 120 (or membership management server 122).

Mobile device 110 includes a first communication interface 204 and a second communication interface 206. As schematically depicted and described herein, a "communication interface" refers to a logical interface through which communication between at least two entities is established and conducted. The communication interface incorporates an address or identifier to which transmission can be directed for reception by the entity utilizing the interface. The address or identifier also serves to identify an origin for transmission from the interface. Further, as utilized herein, the term "communication interface", in addition to including an addressing concept, also includes a modality for the communication between the at least two entities. For instance, one communication interface can be utilized for conversational communications (e.g., voice communication, videoconferencing, etc.) involving real-time or near-time real-time exchanges of audio/video information between the at least two entities. Another communication interface can be utilized for data communications involving transfers of data bits or packets. It is to be appreciated that, depending on a medium of transmission, conversational communications can be implemented by transfers of data bits or packets (e.g., voice over IP); however, as utilized herein, "conversational communication" refers to an audio/video based communication over which a conversation is conducted such as, but not limited to, a telephone or videoconferencing communication. In turn, "data communication" refers to a data transfer of a non-conversational nature.

As a logical interface, the communication interface can include one or more protocols enabling the communication. These protocols can be layered (e.g., according to the OSI model) as one of ordinary skill in the art would appreciate. Further, these protocols can vary depending a medium of transmission. For example, the communication interface can utilize a wired or wireless medium. To this end, as utilized herein, the communication interface also includes physical interfaces and transmit/receive processing chains to implement the communication of the medium. For example, the communication interface can include physical wired or wireless interfaces such as, but not limited to, a USB interface, a serial interface, a WiFi interface, a short-range RF interface (Bluetooth), an infrared interface, a near-field communication (NFC) interface, an Ethernet interface, a fiber optic interface, a cellular radio interface, a satellite interface, etc.

According to one example, first communication interface 204 is utilized by the mobile device 110 for data communications while the second communication interface 206 is utilized for conversational communications. Further to this example, the token 130, the membership information 140, and the request for service 150 described above can be communicated to and from the mobile device 110 as data communications via the first communication interface 204. It is to be appreciated that the first communication interface 204 and the second communication interface 206 can overlap in terms of protocol or physical interface usage. For example, in the situation where the mobile device 110 is operating without a WiFi or other wireless LAN connection, both the first communication interface 204 and the second communication interface 206 can utilize a cellular radio interface of the mobile device 110. Moreover, when mobile device 110 has an active WiFi or wired connection, and the conversational communication is IP-based, both the first communication interface 204 and the second communication interface 206 can utilize a WiFi interface of the mobile device 110.

Mobile device 110 can further include a user interface 210 that comprises various elements to obtain user input and to convey user output. For instance, user interface 210 can comprise a touch display which operates as both an input device and an output device. In addition, user interface 210 can also include various buttons, switches, keys, etc. by which a user can input information to mobile device 110, and other displays, LED indicators, etc. by which other information can be output to the user.

In accordance with an embodiment, mobile device 110 is a computing device, which is readily carried by a member, such a smartphone or tablet device. However, it is to be appreciated that mobile device 110 can be other portable form-factors such as a laptop computer, a convertible laptop, a cell phone, a PDA, a pocket computing device, a watch computing device, or the like. Moreover, while referred to as "mobile" it is to be appreciated that the functionality described herein with respect to mobile device 110 can be performed by a desktop computer, or other larger, less portable computing device. That is, portal application 112 can be installed and executed on substantially any computing device provided that such a computing device can communicate with application server 120 as generally described above with regard to FIG. 1.

Figure 3:
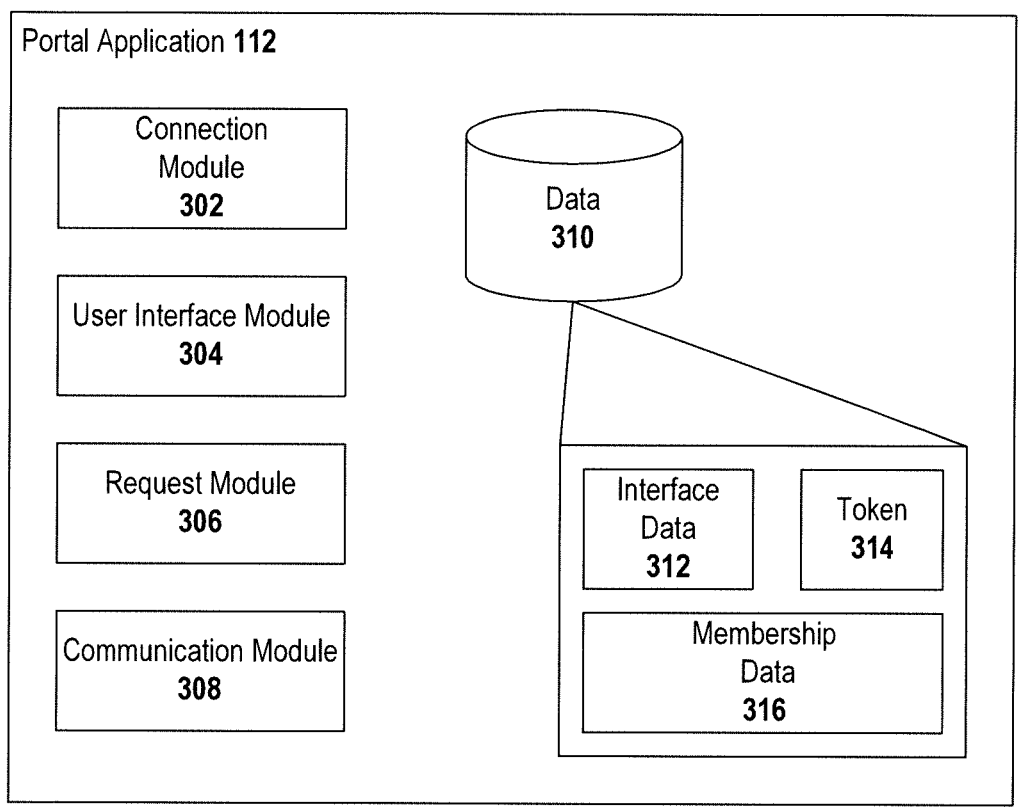
FIG. 3 is a schematic block diagram of an exemplary, non-limiting portal application according to one or more aspects.

FIG. 3 illustrates a block diagram of an exemplary, non-limiting embodiment of portal application 112 according to one or more aspects. Portal application 112 comprises computer-executable instructions and computer-readable data stored on memory 208 of mobile device 110. The computer-executable instructions of portal application 112 are executable by processor 202 of mobile device 110.

As shown in FIG. 3, portal application 112 can include a set of module (e.g., a connection module 302, a user interface module 304, a request module 306, and a communication module 308) and data 310, which can be permanently (i.e., persists across instances) or temporarily (i.e., unavailable across instances) retained. As utilized herein, the term "module" refers to a portion of hardware, a portion of firmware, or a portion of software embodied as computer-executable instructions stored on a computer-readable medium, and/or combinations thereof to perform a function(s), render an action(s), and/or to cause a function or action from another module, method, or system.

The connection module 302, according to an aspect, is configured to establish a connection with the application server 120 (specifically, the membership management server 122). The connection established is an initial connection which is setup upon execution of the portal application 112. When requesting the connection with the application server 120, the connection module 302 communicates an authenticated identity of the member associated with mobile device 110. The communication of the authenticated identity occurs autonomously without additional user input, e.g., without entry of a username and password. For instance, the connection module 302 can transmit token 314 stored as data associated with the portal application 112. As described above, the token 314 can take a variety of forms so long as the information specified thereby is capable of identifying the member within the context of the application server 120 (or membership management server 122).

Upon establishment of the connection by the connection module 302, the portal application 112 can receive interface information or data 312 and membership information or data 316 from the application server 120. According to an example, the portal application 112 can temporarily retain this information, but not maintain this information across instantiations. In another example, the portal application 112 can retain (i.e., cache) at least a portion of this information to make it available for later executions of the portal application 112.

The user interface module 304 is configured to generate a graphical user interface, which can be displayed and/or interacted with via user interface 210 of mobile device 110, based at least in part on the interface data 312. In an aspect, the user interface module 304 can also utilize the membership data 316 when generating the graphical user interface. For instance, portions of the interface data 312, which specify segments of the graphical user interface, can reference portions of the membership data 316. Accordingly, when generating the graphical user interface, the user interface module 304 can extract portions of the membership data 316 referenced by the interface data 312, integrate the data together, and transform the integrated data into a displayable and interactive graphical user interface.

The request module 306 is configured to generate requests, such as request for service 150, which are communicated to the application server 120. When generating a request, the request module 306 can incorporate user input received via the user interface 210 of the mobile device 110. Entry of the user input can be directed by the graphical user interface generated and displayed by the user interface module 304. For instance, the graphical user interface can include forms or other user interface elements configured to solicit specific types of information from the member. This information, in turn, is packaged into the request and transmitted to the application server 120. The request is communication to the application server 120 via the first communication interface 204, for example. Moreover, the request can incorporate the token 314 so as to link the request with the authenticated identity of the member.

By way of example and not limitation, the request can include a query for information on a topic, an appeal for advice on situation, a request for action by the membership provider, an offer of a donation, a general message (i.e., which may or may not oblige a response), a notice of initiation of a conversational communication, or the like. For instance, within the exemplary, generally health-focused membership service previously described, the request can be a general textual message sent to the membership provider. In another example, the request can access a travel advisory service offered by the membership provider. According to this example, the request can incorporate user input such as a travel destination, travel dates, a preferred method of reply, and a comment or question into the request for service 150 transmitted to the application server 120. In yet another example, the request can be a query for information in connection with a health information search service extended by the membership provider. In this case, the request module 306 includes user input such as patient name, patient relationship to member, medical condition, and/or an associated comment or question. Still further, the request can be a request for membership renewal or an offer for a donation, a request to the membership provider to extend an invitation to a prospective member, and/or a request to enable access to membership services to a third-party to utilize on behalf of the member. It is to be appreciated that the foregoing are just some examples of requests that can be communicated from the portal application 112. Other requests contemplated include requests for membership information such as membership status, interaction histories, or the like.

As mentioned above, the request generated by the request module 306 can be a notice of initiation of a conversational communication. The conversational communication, which can be a telephone call, a video conference, etc., can occur via the second communication interface 206. The communication module 308 is configured to direct the second communication interface 206 to establish the conversational communication. For instance, one of interface data 312 or membership data 316 can include an address or handle (for videoconferencing) or a telephone number (for a telephone call) associated with the membership provider that is to be utilized to establish the conversational communication. The address/handle or telephone number is passed to the second communication interface 206 to configure the conversational communication. According to one aspect, the address/handle or telephone number can be general such that all members receive the same information. In another aspect, this information can be specific to the member such that member is assigned to a designated representative associated with the membership provider.

Figure 4:
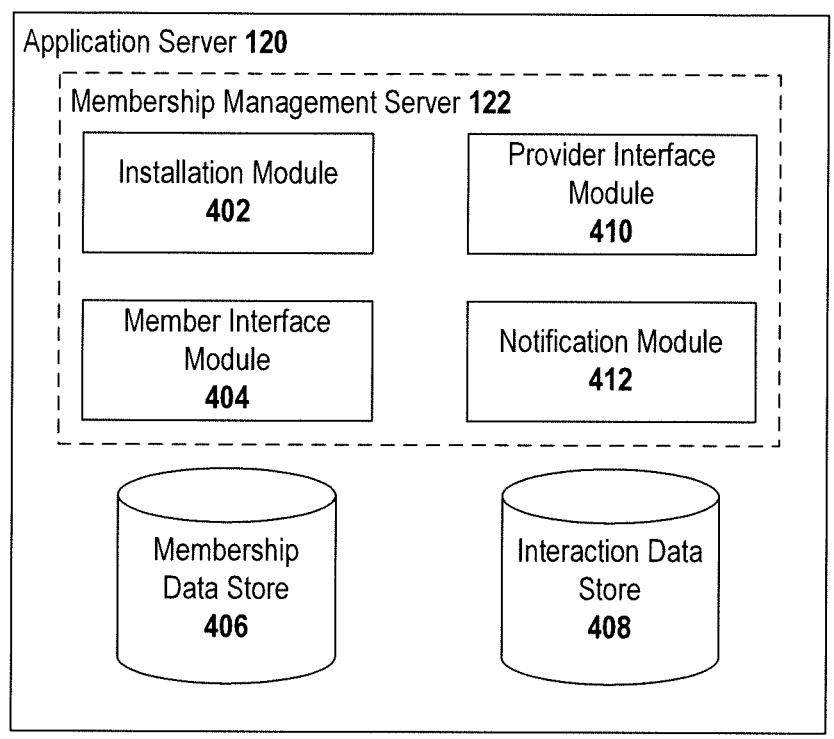
FIG. 4 is a schematic block diagram of an exemplary, non-limiting application server in accordance with one or more aspects.

Turning now to FIG. 4, illustrated is an exemplary, non-limiting embodiment of an application server 120. It is to be appreciated that application server 120 can be a single server or a group of servers operating jointly to support portal application 112. As understood by one of ordinary skill in the art, a server is computing device comprising one or more computer processors coupled to a memory (e.g., a non-transitory, computer-readable storage medium) storing computer-executable instructions for providing a service or remote functionality to one or more client devices such as mobile device 110 running portal application 112. The server can be a virtual machine including virtualized hardware elements executing on one or more physical computing devices. According to another embodiment, the application server 120 can be a package of computer-executable instructions and computer-readable data, which is executed on a virtual platform. The virtual platform can include an bundle of computing resources provided by one or more physical computing devices and can provide an execution environment for the application server 120. In other words, application server 120 can be provided as a cloud-based service and, further, can be provided on top of additional cloud computing services (e.g., platform-as-a-service, infrastructure-as-a-service, etc.).

As shown in FIG. 4, application server can include a membership management server 122, a membership data store 406, and an interaction data store 408. The membership data store 406 can store membership data or information, as described above, which is associated with members. The interaction data store 408, in an aspect, can store interaction information or histories. The interaction information can record details for individual incidents (i.e., interaction events) between the member and the membership provider.

As with the portal application 112, the membership management server 122 can include a set of modules—namely, an installation module 402, a member interface module 404, a provider interface module 410, and a notification module 412. The installation module 402 is configured to install the portal application 112 to a mobile device of a member and, thus, transform the mobile device into a membership card and a medium of access to membership services. Installation can commence with an invitation or other communication sent to the member. The invitation, which can include a URL, for example, can be an email, a text message, etc. sent to the member. The URL can include a one-time code generated for the member for the invitation. When the URL is accessed, by the mobile device of the member for example, the one-time code is provided to the installation module 402. The installation module 402 can verify that the one-time code embedded in the URL is valid (e.g., not expired, not forged, etc.) and, if so, the membership management server 122 can respond to the URL request with installation instructions. In the example where portal application 112 is a standalone or sandboxed web application, which utilized but is isolated from a web browser application of the mobile device, the installation module 402 updates a status of the installation process and records an address or other identifier associated with the received URL request from the mobile device. According to an aspect, the status can be stored in the membership data store 406 and updated to reflect a change in status from an invitation-sent status to an invitation-accessed status (or a code confirmed status). Upon status update, i.e. upon receiving the URL request and confirm the one-time code, installation is to be finalized within a predetermined time period (e.g., minutes, hours, etc.). Following verification of the one-time code (and transmission of further installation instructions), the member follows the instructions and upon completion, the portal application 112, now installed on the mobile device, contacts the application server 120. A source address or identifier associated with this contact to the application server 120 is extracted by the installation module 402 and compared with the recorded address associated with the communication of the one-time code. When matched, and the predetermined time period is not lapsed, the installation module 402 can generate a permanent token and communicate the permanent token to the portal application 112 to be used an authenticated identity associated with the member. The permanent token can be recorded in the membership data store 406 in associated with membership information corresponding to the member.

The member interface module 404 is configured to communicate with portal application 112 to receive information from and send information to the portal application 112. For instance, the member interface module 404 can send interface data to the portal application 112, which is utilized to generate a graphical user interface enabling operation of the functionality of the portal application 112. Further, the member interface module 404 can receive requests from the portal application 112 and other communications involving the authenticated identity of the member. The requests can include the aforementioned request for service 150, or a resource request, i.e. a request for interface data or membership data. The member interface module 404, upon receipt of a transmission from the portal application 112, can verify if an embedded authenticated identity (e.g., token) is included and, if so, whether the authenticated identity corresponds to a member. Upon verification and confirmation, the member interface module 404 can retrieve requested interface data and/or membership data and transmit the same to the portal application 112.

In response to a request for service, the member interface module 404 can perform the verification and confirmation functions in relation to the authenticated identity embedded therein. Subsequently, the member interface module 404 forwards the request for service to the notification module 412. The notification module 412 issues a notification of the request for service, which includes information related to the request. The notification can be, for example, an email, a text message, a page, a push notification, or the like, which is broadcasted to one or more consultants of the membership provider. As described above, the consultants, in response to the notification, can take the necessary actions to respond to and/or provide service to the member in accordance with the request.

According to one example, the notification module 412 is further configured to open a new incident in the interaction data store 408. Alternatively, the consultants, employing a computing device (see FIG. 5), can access the membership management server 122 via the provider interface module 410 to create the new incident. The provider interface module 410 enables administrative access to the membership management server 122, creation and update of incident records (e.g., interaction information), issuances of invitations, and the like.

Figure 5:
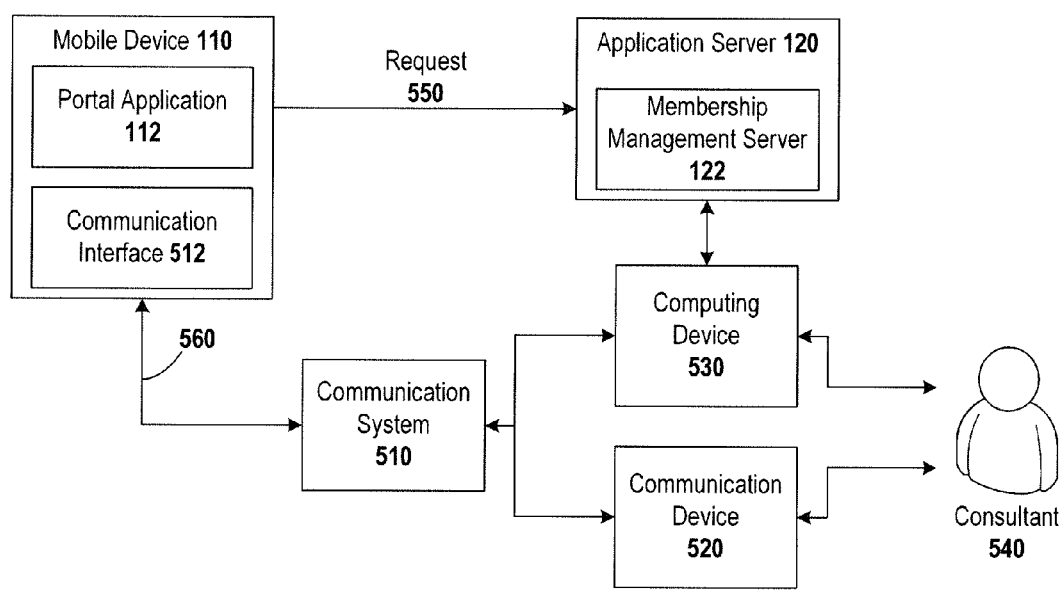
FIG. 5 is a schematic block diagram of an exemplary, non-limiting embodiment for the membership-based service having multiple modes of communication according to an aspect.

Turning to FIG. 5, illustrated is a schematic block diagram of an exemplary, non-limiting embodiment for the membership-based service having multiple modes of communication. As shown, the mobile device 110 having the portal application 112 can communicate requests 550 to the application server 120 having the membership management server 122. As described above, request 550 can be a notice of initiation of a conversational communication 560 via a different modality that that over which the request 550 is transmitted.

The mobile device 110 includes a communication interface 512 utilized to establish and conduct the conversational communication 560. AS shown in FIG. 5, the membership provider can have a communication system 510, associated therewith, that enables contact with the member via the conversational communication 560. For instance, the communication system 510 can be phone system of the membership provider. Alternatively, the communication system 510 can be a computer network (e.g., a LAN) of the membership provider. The communication system 510 can be coupled to a communication device 520 and/or a computing device 530 associated with a consultant 540 of the membership provider. According to an example, the communication device 520 can be a telephone to receive a call from the member. In other example, the communication device 520 can be incorporated into the computing device 530 or another computing device (e.g., a tablet device or mobile device), which is capable of videoconferencing.

The consultant 540, by way of notification sent from membership management server 122 to computing device 530 in response to request 550, is informed of an identity of the member initiating the conversational communication 560 via the communication system 510. Accordingly, even in situations where an identity is not transmitted via the communication system 510 (for example, privacy settings or other mechanism which blocks caller ID information), the consultant 540 is informed of the identity of the member. The consultant 540 executes an interaction with the member via the conversational communication 560 while recording details of the interaction within the membership management server 122 via the provider interface module 410 (see FIG. 4) communicatively coupled to the computing device 530.

In view of the exemplary, non-limiting devices, servers, and systems described supra, various methodologies can be implemented in accordance with the disclosed are better appreciated with reference to flow diagrams of FIGS. 6-9. The flow diagrams are shown and described as a series of blocks. However, the claimed subject matter is not limited by the order of the blocks depicted and described herein, as some blocks can occur in different orders and/or concurrently with other blocks.

Figure 6:
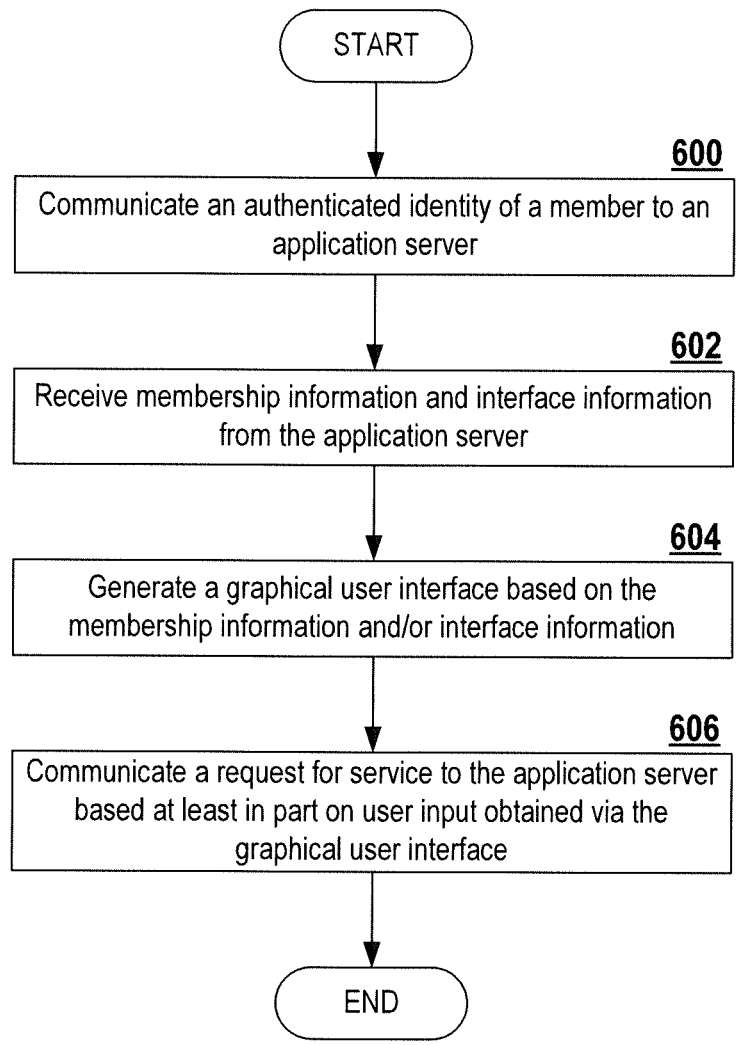
FIG. 6 is a flow diagram of an exemplary, non-limiting method for accessing membership services.

Turning now to FIG. 6, a flow diagram of an exemplary, non-limiting method for accessing membership services is illustrated. The method can be performed by mobile device 110 and, specifically portal application 112 installed thereon, for example. At 600, an authenticated identity of a member to an application server. According to an aspect, the authenticated identity can be a token or other information which is stored on a mobile device of the member. Upon execution (i.e., launch) of a portal application on the mobile device, which is utilized to access membership services, the authenticated identity is autonomously, and without further user input or action, transmitted to the application server to alert the application that the member is contacting the service. At 602, membership information and/or interface information is received from the application server. At least a portion of the membership information and/or the interface information corresponds to the member and is retrieve, by the application server, based on the authenticated identity communicated at 600. At 604, a graphical user interface is generated. The graphical user interface can be generated based on the membership information and/or the interface information to provide an interface which is customized or personalized for the member. At 606, a request for service is communicated to the application server. The request for service is based, at least in part, on user input obtained via the graphical user interface.

Figure 7:
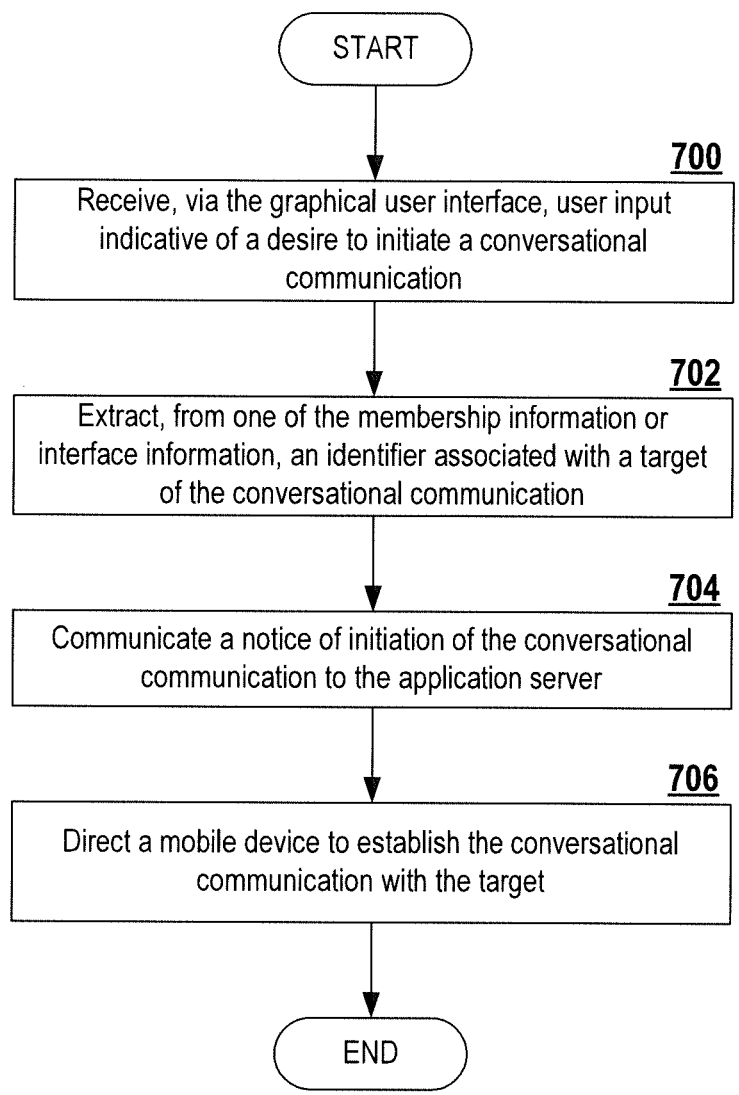
FIG. 7 is a flow diagram of an exemplary, non-limiting method for establishing a parallel communication via a different modality.

FIG. 7 illustrates a flow diagram of an exemplary, non-limiting method for establishing a parallel communication via a different modality. Like the method of FIG. 6, this method can be performed by mobile device 110 and portal application 112 described above. At 700, user input is received via the graphical user interface. The user input is indicative of a desire to initiate a conversational communication. At 702, an identifier associated with a target of the conversational communication is extracted from at least one of the membership information or interface information. The identifier can be, for example, a telephone number or a videoconferencing handle. At 704, a notice of initiation of the conversational communication is transmitted to the application server. At 706, the mobile device is directed to establish the conversational communication with the target.

Figure 8:
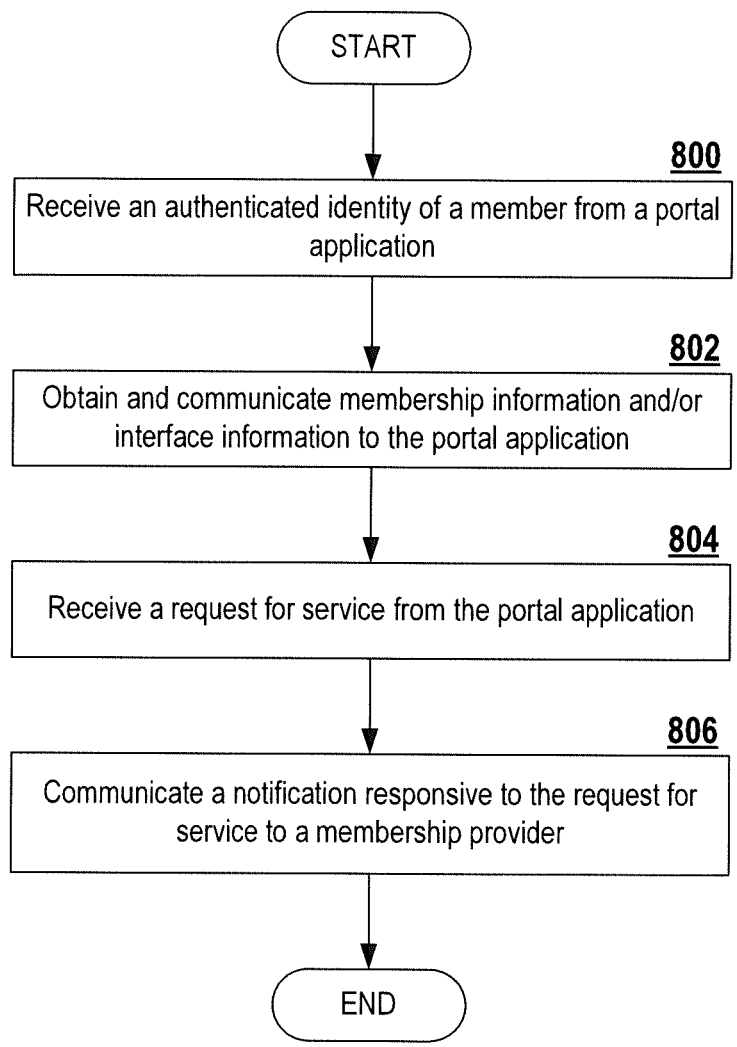
FIG. 8 is a flow diagram of an exemplary, non-limiting method for providing access to membership services.

FIG. 8 illustrates a flow diagram of an exemplary, non-limiting method for providing access to membership services. According to an aspect, the method can be performed by the application server 120 and the membership management server 122 described above. At 800, an authenticated identity of a member is received from a portal application. The authenticated identity can comprise a token which is verified and confirmed based on a corresponding token stored on a non-transitory, computer-readable storage medium. At 802, membership information and/or interface information is obtained based on the authenticated identity. For example, the membership information and/or interface information obtained can be stored in association with the authenticated identity such that the information can tailored to the member. The information, once obtained, is communicated to the portal application. At 804, a request for service is received from the portal application. At 806, a notification responsive to the request is communicated to a membership provider. Particularly, according to one example, the notification is communicated to one or more representatives of the membership provider.

Figure 9:
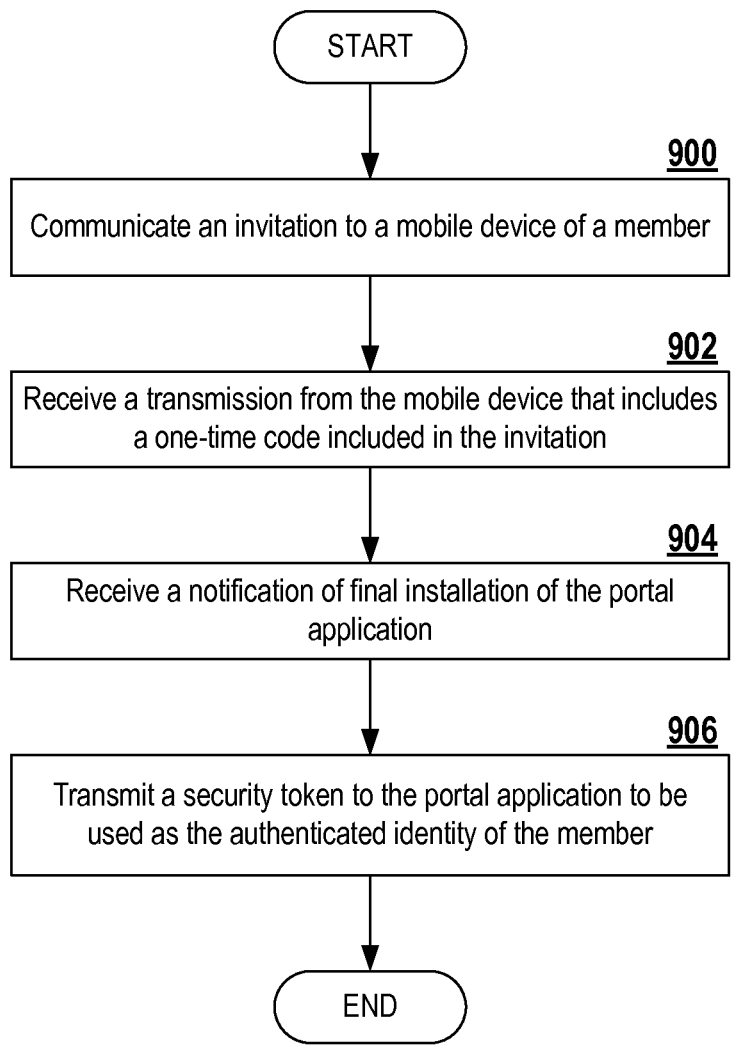
FIG. 9 is a flow diagram of an exemplary, non-limiting embodiment of a method for installing a portal application to a mobile device of a member according to one or more aspects.

FIG. 9 illustrates a flow diagram of an exemplary, non-limiting embodiment of a method for installing a portal application to a mobile device of a member according to one or more aspects. As with the method of FIG. 8, this method can be performed by the application server 120 and the membership management server 122 described above. At 900, an invitation is communicated to the mobile device of the member. The invitation can include a one-time code utilized to detect activation of the invitation by the member. At 902, a transmission from the mobile device that includes the one-time code is received. At 904, a notification of final installation of the portal application is received. According to one example, a source IP address corresponding to the transmission of the one-time code is recorded. A subsequent request, from the same IP address, within a predetermine time period operates as the notification of final installation. At 906, a security token is transmitted to the portal application. The security token is utilized as the authenticated identity of the member.

One of ordinary skill in the art can appreciate that the various embodiments of a membership-based service described herein can be implemented in connection with any computing device, client device, or server device, which can be deployed as part of a computer network or in a distributed computing environment such as the cloud. The various embodiments described herein can be implemented in substantially any computer system or computing environment having any number of memory or storage units, any number of processing units, and any number of applications and processes occurring across any number of storage units and processing units. This includes, but is not limited to, cloud environments with physical computing devices (e.g., servers) aggregating computing resources (i.e., memory, persistent storage, processor cycles, network bandwidth, etc.) which are distributed among a plurality of computable objects. The physical computing devices can intercommunicate via a variety of physical communication links such as wired communication media (e.g., fiber optics, twisted pair wires, coaxial cables, etc.) and/or wireless communication media (e.g., microwave, satellite, cellular, radio or spread spectrum, free-space optical, etc.). The physical computing devices can be aggregated and exposed according to various levels of abstraction for use by application or service providers, to provide computing services or functionality to client computing devices. The client computing devices can access the computing services or functionality via application program interfaces (APIs), web browsers, or other standalone or networked applications. Accordingly, aspects of the membership-based service can be implemented based on such a cloud environment. For example, application server 120, or more precisely the membership management server 122, can reside in the cloud environment such that the computer-executable instruction implementing the functionality thereof are executed with the aggregated computing resources provided by the plurality of physical computing devices. The cloud environment provides one or more methods of access to the membership management server 122, which are utilized by portal application 112 on mobile device 110. These methods of access include IP addresses, domain names, URIs, etc. Since the aggregated computing resources can be provided by physical computing device remotely located from one another, the cloud environment can include additional devices such as a routers, load balancers, switches, etc., that appropriately coordinate network data.

Figure 10:
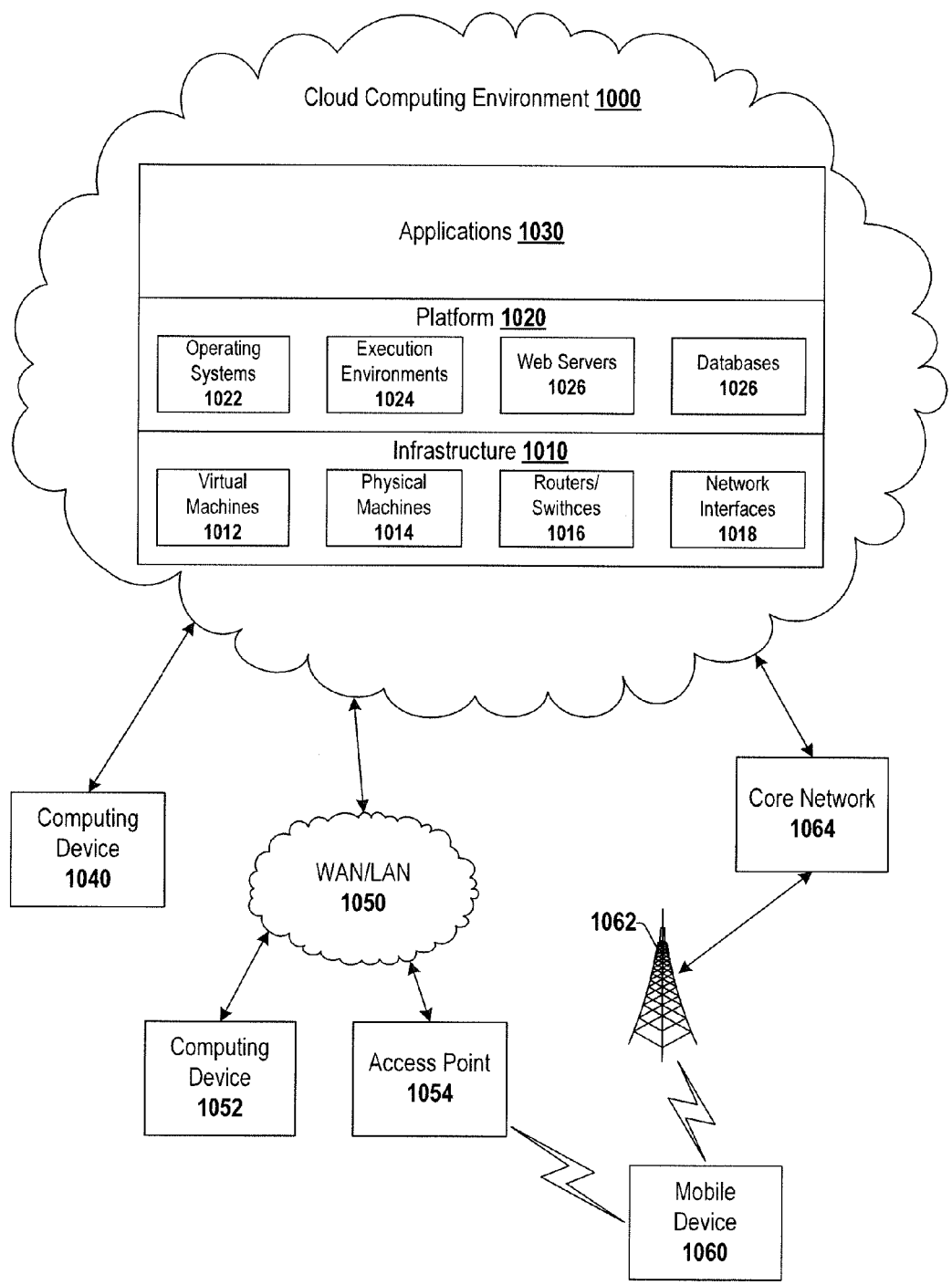
FIG. 10 is a block diagram representing an exemplary, non-limiting networked environment, including cloud or internet based, in which various embodiments described herein can be implemented.

FIG. 10 provides a schematic diagram of an exemplary networked or distributed computing environment, such as a cloud computing environment 1000. The cloud computing environment 1000 represents a collection of computing resources available, typically via the Internet, to one or more client devices. The cloud computing environment 1000 comprises various levels of abstraction: infrastructure 1010, a platform 1020, and applications 1030. Each level, from infrastructure 1010 to applications 1030 is generally implemented on top of lower levels, with infrastructure 1010 representing the lowest level.

Infrastructure 1010 generally encompasses the physical resources and components on which cloud services are deployed. For instance, infrastructure 1010 can include virtual machines 1012, physical machines 1014, routers/switches 1016, and network interfaces 1018. The network interfaces 1018 provide access to the cloud computing environment 1000, via the Internet or other network, from client devices such as computing devices 1040, 1052, 1060, etc. That is, network interfaces 1018 provide an outermost boundary of cloud computing environment 1000 and couple the cloud computing environment 1000 to other networks, the Internet, and client computing devices. Routers/switches 1016 couple the network interfaces 1018 to physical machines 1014, which are computing devices comprising computer processors, memory, mass storage devices, etc. Hardware of physical machines 1014 can be virtualized to provide virtual machines 1012. In an aspect, virtual machines 1012 can be executed on one or more physical machines 1014. That is, one physical machine 1014 can include a plurality of virtual machines 1012.

Implemented on infrastructure 1010, platform 1020 includes software that forming a foundation for applications 1030. The software forming platform 1020 includes operating systems 1022, programming or execution environments 1024, web servers 1026, and databases 1028. The software of platform 1020 can be installed on virtual machines 1012 and/or physical machines 1014.

Applications 1030 include user-facing software applications, implemented on platform 1020, that provide services to various client devices. In this regard, the membership management server 122 of the membership service described herein is an example application 1030. As illustrated in FIG. 10, client devices can include computing devices 1040, 1052 and mobile device 1060. Computing devices 1040, 1052 can be directly coupled to the Internet, and therefore the cloud computing environment 1000, or indirectly coupled to the Internet via a WAN/LAN 1050. The WAN/LAN 1050 can include an access point 1054 that enables wireless communications (e.g., WiFi) with mobile device 1060. In this regard, via access point 1054 and WAN/LAN 1050, mobile device 1060 can communicate wirelessly with the cloud computing environment 1000. Mobile device 1060 can also wirelessly communicate according to cellular technology such as, but not limited to, GSM, LTE, WiMAX, HSPA, etc. Accordingly, mobile device 1060 can wireless communicate with a base station 1062, which is coupled to a core network 1064 of a wireless communication provider. The core network 1064 includes a gateway to the Internet and, via the Internet, provides a communication path to the cloud computing environment 1000.

As mentioned, advantageously, the techniques described herein can be applied to any device where it is desirable to integrate a medium of identification and a medium of interaction to a single device in the context of a membership-based service. It can be understood, therefore, that handheld, portable and other computing devices and computing objects of all kinds are contemplated for use in connection with the various embodiments of a membership-based service. Accordingly, the below general purpose computer described below in FIG. 11 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
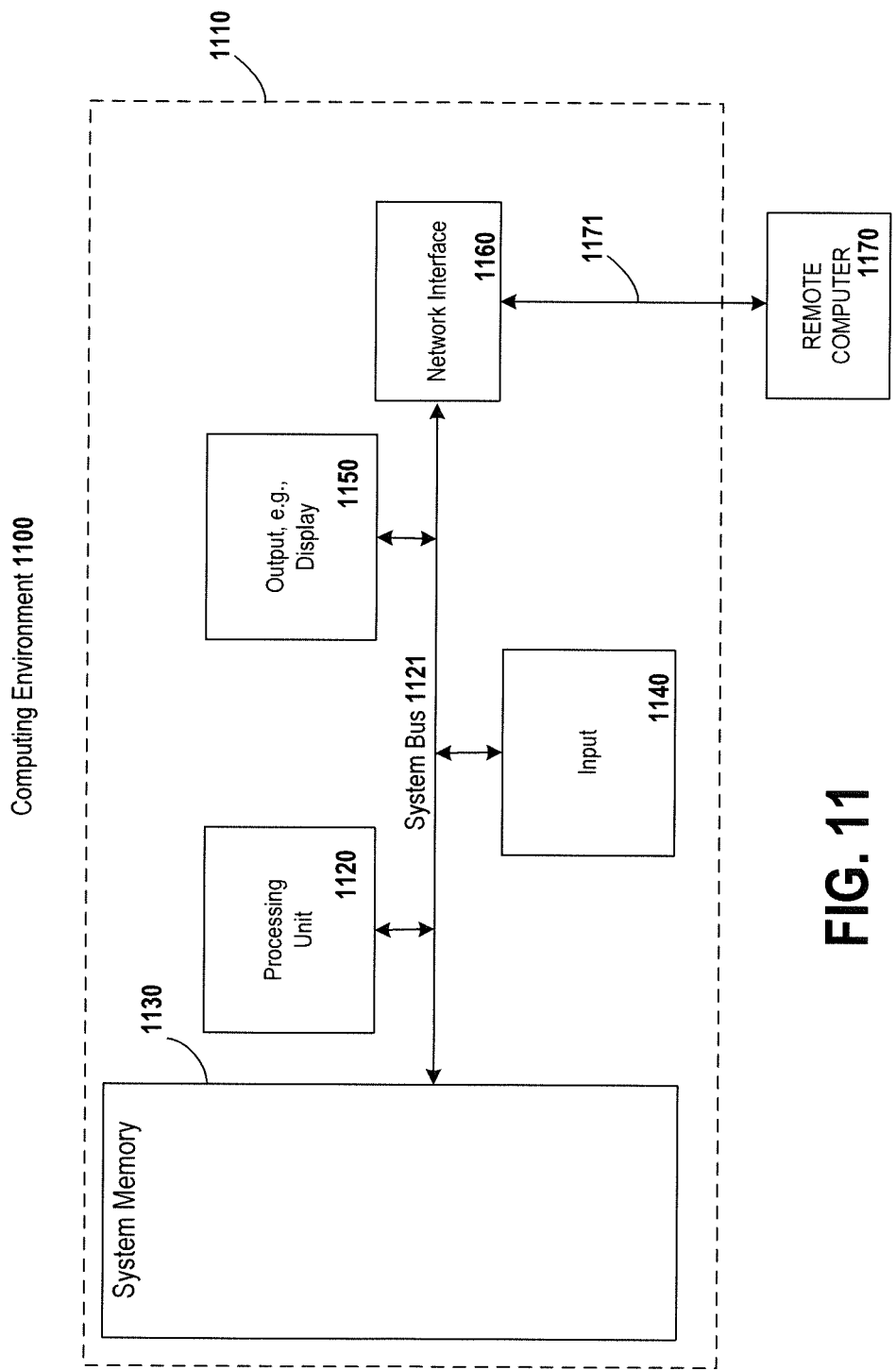
FIG. 11 is a block diagram representing an exemplary, non-limiting computing system or operating environment in which one or more aspects of various embodiments described herein can be implemented.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the exemplary computing system environment 1100.

With reference to FIG. 11, an exemplary device for implementing one or more embodiments includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, system memory 1130 may also include an operating system, application programs, other program modules, and program data. According to a further example, computer 1110 can also include a variety of other media (not shown), which can include, without limitation, RAM, ROM, EEPROM, flash memory or other memory technology, compact disk (CD) ROM, digital versatile disk (DVD) or other optical disk storage, or other tangible and/or non-transitory media which can be used to store desired information.

A user can enter commands and information into the computer 1110 through input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to implement a membership-based service as described herein.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As utilized herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

This written description uses examples to disclose the invention, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A mobile device, comprising:
   a processor;
   a non-transitory, computer-readable medium coupled to the processor;
   a first communication interface configured to enable communication with an application server; and
   a second communication interface configured to enable communication via a different modality than the first communication interface,
   wherein the non-transitory, computer-readable medium stores computer-executable instructions for a portal application, the portal application, when executed, configures the processor of the mobile device to:
      communicate, autonomously and upon initial execution of the portal application by the processor, an encrypted authenticated identity token of a member of a membership-based service to the application server via the first communication interface;
      receive, from the application server via the first communication interface, membership information associated with the member, the membership information being retrieved by the application server based at least in part on the authenticated identity token; and
      communicate a request for service including the authenticated identity token to the application server via the first communication interface, wherein services available for request are specified at least in part by the membership information and the application server routes the request for service to a consultant corresponding to the member identified by the authenticated identity token,
   wherein when the request for service sent to the application server is a notice of initiation of a communication using the different modality, the portal application further configures the processor to initiate the communication using the different modality via the second communication interface when the request for service is sent.

2. The mobile device of claim 1, wherein the communication is initiated with a communication system associated with the application server.

3. The mobile device of claim 1, wherein the second communication interface is a phone interface and the different modality is a voice communication.

4. The mobile device of claim 1, wherein the request for service includes at least one of a request for information, a request for action, a renewal request, an invitation request, or a donation request.

5. The mobile device of claim 1, wherein the portal application further configures the processor to:
   receive interface information related to at least a structure of a graphical user interface displayable on a display of the mobile device;
   generate the graphical user interface based at least on the interface information and the membership information; and
   display the graphical user interface on the display of the mobile device.

6. The mobile device of claim 1, wherein the portal application further configures the processor to receive user input, via an input device of the mobile device, and to generate the request for services based at least in part on the user input.

7. A system, comprising:
   an application server having a processor, a non-transitory, computer-readable storage medium coupled to the processor, and a communication interface configured to communicate with at least a computing device associated with a consultant of a membership provider and a mobile device of a member;
   a communication system configured to enable communication with the mobile device of the member via a different modality than utilized by the communication interface of the application server; and
   a communication device associated with the consultant of membership provider that enables communication with the mobile device of the member via the different modality over the communication system,
   wherein the non-transitory, computer-readable medium stores computer-executable instructions for a membership management application, the membership management application, when executed, configures the processor to:
      transmit an invitation to join a membership service offered by the membership provider, including a one time code, to the mobile device of the member;
      record mobile device identifying information when the invitation is accepted;
      compare mobile device identifying information received when the mobile device first executes an application related to the membership service to the recorded mobile device identifying information;
      if the mobile device identifying information matches, issue authenticated identity information to the mobile device;

receive, from the mobile device of the member, an authenticated identity associated with the member;

communicate membership information to the mobile device, the membership information being retrievable from a data store on the non-transitory, computer-readable medium and stored in relation with the authenticated identity;

receive, from the mobile device of the member, a request for service corresponding to services offered by the membership provider;

identify the consultant of the membership provider based on the authenticated identity received from the mobile device; and communicate, to the computing device associated with the consultant of the membership provider, a notification that includes the request for service and identification information associated with the request for service, and wherein when the request for service is a notice of initiation of a communication using the different modality by the mobile device of the member, the communication device of the consultant receives the communication from the mobile device when the request for service is sent to the application server by the mobile device.

8. The system of claim 7, wherein the request for service, when received, incorporates the authenticated identity of the member corresponding to the mobile device communicating the request for service.

9. The system of claim 7, wherein the request for service received from the mobile device incorporates the authenticated identity, and wherein the membership management application further configures the processor to:

extract the authenticated identity from the request for service;

generate identification information based on data retrieved from the non-transitory, computer-readable medium, the data retrieved being stored in associated with the authenticated identity; and generate the notification to include the identification information.

10. The system of claim 7, wherein the membership management application further configures the processor to:

receive, from the computing device associated with the membership provider, interaction information specifying a history of interaction between the membership provider and the member; and store the interaction information on the non-transitory, computer-readable medium of the application server.

11. The system of claim 7, wherein the request for service is a request to share access to membership services, and wherein the membership management application further configures the processor to:

extract, from the request to share access, an identity of a person to which access is to be shared; and communicate, to a second mobile device associated with the person to which access is to be shared, an invitation to install a portal application to the second mobile device.

12. The system of claim 7, wherein the membership management application further configures the processor to revoke the authenticated identity associated with the mobile device of the member.

13. The system of claim 7, wherein the consultant of the membership provider is designated to the member.

* * * * *